(No Model.) 2 Sheets—Sheet 1.
G. S. COX.
UNDERGROUND CONDUIT FOR ELECTRIC CONDUCTORS.
No. 327,383. Patented Sept. 29, 1885.
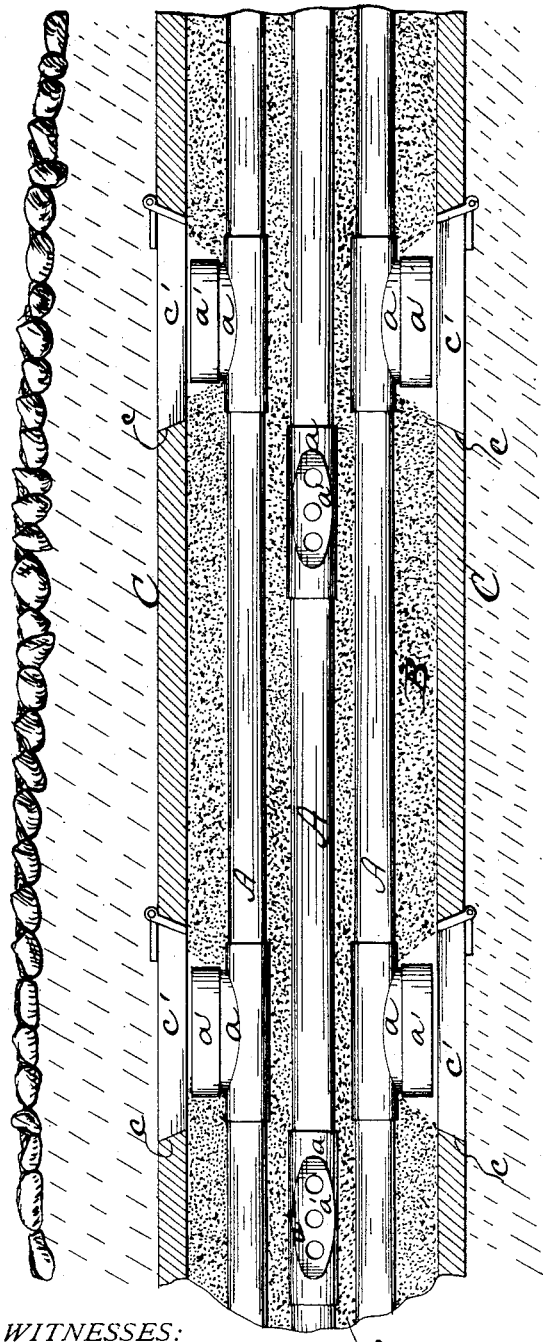
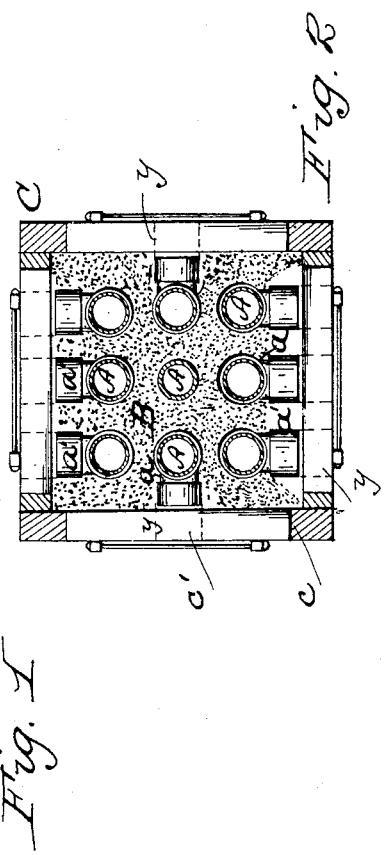
WITNESSES:
John Rodgers
Abm. D. Ashbridge Jr.
INVENTOR,
George S. Cox
By S. J. Van Stavoren
ATTORNEY (No Model.) 2 Sheets—Sheet 2.

G. S. COX.
UNDERGROUND CONDUIT FOR ELECTRIC CONDUCTORS.

No. 327,383. Patented Sept. 29, 1885.

WITNESSES:
John Rodgers
Abm. D. Ashbridge Jr.

INVENTOR,
George S. Cox
By S. J. Van Stavoren
ATTORNEY

UNITED STATES PATENT OFFICE.

GEORGE S. COX, OF PHILADELPHIA, PENNSYLVANIA.

UNDERGROUND CONDUIT FOR ELECTRIC CONDUCTORS.

SPECIFICATION forming part of Letters Patent No. 327,383, dated September 29, 1885.

Application filed May 15, 1885. (No model.)

*To all whom it may concern:*

Be it known that I, GEORGE S. COX, a citizen of the United States, residing at Philadelphia, in the county of Philadelphia and State of Pennsylvania, have invented certain new and useful Improvements in Underground Conduits for Electric Wires or Conductors, of which the following is a specification, reference being had therein to the accompanying drawings, wherein—

Figure 3:
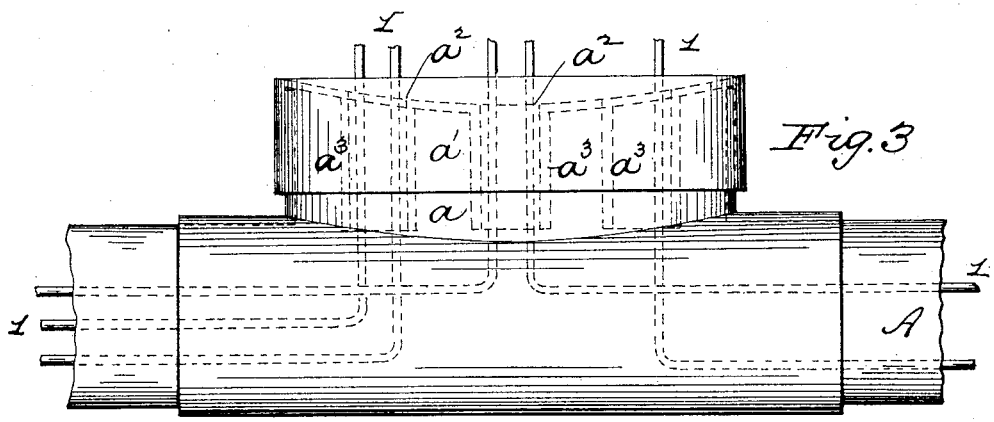
Figure 4:
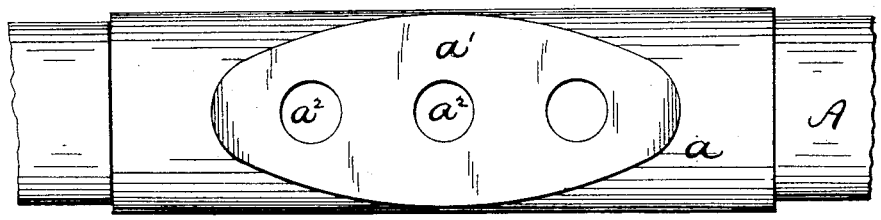
Figure 5:
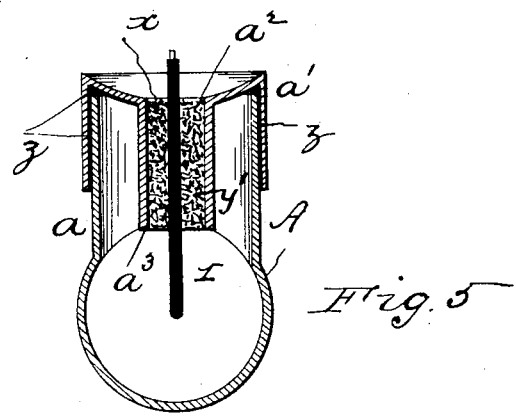

Figure 1 is a longitudinal vertical section of a portion of an underground conduit for electric cables or wires, showing the separate pipes for holding the electric wires provided with tapping stations or chambers embodying my improvements. Fig. 2 is a cross-section of same. Fig. 3 is an elevation of a part of a pipe and its tapping-station. Fig. 4 is a plan, and Fig. 5 is a vertical transverse section, of same.

My invention has relation generally to tapping-stations for underground conduits for electric or other wires, and has particular reference to those systems or constructions of underground conduits wherein separate or sub pipes for holding the electric wires are inclosed in one large pipe or conduit; and it has for its object to provide the separate or sub pipes with simple and inexpensive tapping chambers or stations, access to which is readily obtained.

My invention accordingly consists of the combination, construction, and arrangement of parts, as hereinafter described and claimed, having reference particularly to a pipe having lateral chambers or stations extending preferably longitudinally with the pipe, and which have caps or covers provided with one or more flanges or short pipe-sections depending into the stations, and through which pass the tapping or other wires desired to be led into or out of the stations. Between the latter and their covers, if desired, is inserted a packing of paper or other suitable material to exclude moisture, pitch, or cement from the tapping-stations and the pipes.

In the drawings I have shown my improvements applied to that system of underground conduits wherein the pipes A for holding the wires are embedded in pitch, cement, or other material, B, all of which is inclosed in a suitable large pipe or conduit, C, made of wood, metal, or other material, as desired, it being preferably made of planks arranged to have in cross-section the form of a square, oblong, or other figure, as deemed advisable.

The pipes A are at suitable intervals formed or provided with lateral chambers $a$, which are preferably arranged longitudinally with the pipes, as shown. These chambers are provided with caps or covers $a'$, the tops of which are preferably concave or dish-shape, as shown, and in which are openings $a^2$, flanged or provided with short pipe-sections $a^3$, which depend down into the chamber or stations $a$, as indicated. Through these depending pipes the tapping or other wires, 1, are led into or out of the pipes A, as shown more plainly in Figs. 3 and 5, and are held in position therein by means of cement, pitch, or other suitable material, as indicated at $y'$, Fig. 5.

The tapping-stations $a$ may extend to the inner side of the main or large conduit B, as shown in Figs. 1 and 2, in which case the walls of said conduit will be provided with openings $c$, closed by hinged doors $c'$, located adjacent to said stations, or they may extend through the walls of conduit C, as indicated by dotted lines $y$, Fig. 2.

The stations or chambers $a$ on pipes A may be variously arranged to project toward or through the top, bottom, and sides of conduit, as illustrated, or they may be otherwise arranged or disposed of, as desired.

The tapping-stations are preferably placed only upon the outside pipes, or those holding wires designed to be tapped, and not upon the inside ones, or those in which the trunk-lines are inserted, (see Fig. 2;) but, if advisable, all the pipes may be furnished with stations.

In the system of underground conduits herein described it will be necessary to indicate along the line of way the points at which the tapping-stations are located, in order to avoid unnecessary digging to obtain access thereto; or such result may be obtained by calculations from a drawing of the line-conduit and its stations.

To prevent moisture, cement, pitch, or other like material entering the testing-chamber, a packing of paper, rubber, or other suitable material may be inserted between the covers and the walls of the stations, as indicated at $z$, Fig. 5.

While I have described my improvements especially applicable to a particular system of underground electric-wire conduits, yet I do not limit them thereto, as it is evident that the tapping-stations herein described may be applied to other systems or constructions of pipes or conduits, or to single pipes holding one, a number, or all of the electric wires.

The stations may be made of metal, sheet, cast, or wrought, or of any other desirable and suitable material. So, too, my improvements are applicable to aerial or overhead lines of pipes containing electric conductors, and accordingly I do not confine the same to underground conduits.

I have shown the tapping-station covers provided with three flanges or pipe-sections, $a^3$, but one or a less number or more than three may be used.

What I claim is —

1. A pipe having chamber $a$, with cap or cover $a'$, having opening $a^2$, with depending flanges or pipe-sections $a^3$, substantially as set forth.

2. A conduit for electric wires or cables, having a longitudinally-arranged tapping-chamber provided with a cap or cover, having one or more openings and depending flanges or pipe-sections in line with said openings, substantially as shown and described.

3. The pipe A, having tapping-stations $a$, provided with covers $a'$, having one or more openings, $a^2$, and pipe-sections or flanges $a^3$, and a packing material between said stations and covers, substantially as shown and described.

4. In a system of underground conduits for electric cables, the combination of main conduit C and the sub conduits or pipes A, having tapping-chambers $a$, provided with caps $a'$, having openings $a^2$, and depending flanges or pipe-sections $a^3$, substantially as shown and described.

5. In a system of underground conduits for electric cables or wires, the combination, with main conduit C, having at intervals along its length top, bottom, and side openings $c$, and doors or covers $c'$ therefor, of sub-conduits A, having adjacent to openings $c$ in said main conduit, separately-attached chambers $a$, provided with caps $a'$, having openings $a^2$ and depending flanges $a^3$, arranged substantially as shown and described.

In testimony whereof I affix my signature in presence of two witnesses.

GEORGE S. COX.

Witnesses:
S. J. VAN STAVOREN,
CHAS. F. VAN HORN.